(12) United States Patent
Kleiner

(10) Patent No.: US 6,796,756 B1
(45) Date of Patent: Sep. 28, 2004

(54) CLAMPING SYSTEM FOR HIGH SPEEDS

(75) Inventor: Gilbert Kleiner, Inzigkofen-Vilsingen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 09/959,739

(22) PCT Filed: May 4, 2000

(86) PCT No.: PCT/EP00/04000

§ 371 (c)(1),
(2), (4) Date: Jan. 22, 2002

(87) PCT Pub. No.: WO00/67938

PCT Pub. Date: Nov. 16, 2000

(30) Foreign Application Priority Data

May 5, 1999 (DE) .......................................... 199 20 748

(51) Int. Cl.[7] .......................................... B23B 31/103
(52) U.S. Cl. ..................... 409/232; 279/2.24; 279/67; 279/155; 82/160; 408/240; 403/322.1
(58) Field of Search .............................. 409/232, 234; 82/160; 279/2.19, 2.24, 67, 20, 155; 408/239 R, 239 A, 240, 56; 403/297, 324, 322.1

(56) References Cited

U.S. PATENT DOCUMENTS 5,150,995 A  *  9/1992  Reinauer ..................... 409/234
5,466,102 A      11/1995  Erickson
5,722,806 A  *  3/1998  Erickson et al. ............. 409/233
5,851,093 A  *  12/1998  Erickson ...................... 409/234
5,957,639 A  *  9/1999  Freyermuth et al. ......... 409/232
6,457,920 B1 *  10/2002  Kleiner ....................... 409/232
6,579,027 B1 *  6/2003  Stolz ........................... 403/297

FOREIGN PATENT DOCUMENTS

| DE | 275426 | * | 1/1990 | ............... 409/232 |
| DE | 4221735 | * | 3/1993 | ......... B23B/31/107 |
| DE | 4228558 | * | 2/1994 | ......... B23B/31/107 |
| DE | 197 53 663 | | 6/1999 | |
| EP | 563979 | * | 4/1993 | ........... B23B/31/40 |
| FR | 2 754 201 | | 4/1998 | |
| WO | 94 05451 | | 3/1994 | |

* cited by examiner

Primary Examiner—Daniel W. Howell
(74) Attorney, Agent, or Firm—Oblon, Spivak, McClelland, Maier & Neustadt, P.C.

(57) ABSTRACT

A clamping system includes a clamping device that is coaxially located in a receiving section and that extends into the hollow shaft of one piece when two pieces are joined. The clamping system further includes two clamping bodies that can be displaced in opposite directions and an actuating device that drives the clamping bodies. The actuating device displaces the clamping bodies in a synchronous manner into an engaged relation and a disengaged relation with an undercut clamping shoulder of the hollow shaft, whereby a pressure force is applied between the flat surfaces of the two pieces to be connected.

18 Claims, 5 Drawing Sheets

CLAMPING SYSTEM FOR HIGH SPEEDS

The present invention relates to a chucking system, designed for high speeds, for detachable connection of two parts, such as is used, for example, for coupling a workpiece or tool carrier, for example in the form of a basic tool mount, and a manipulating means, such as a spindle of a machine tool, or for coupling tool-system modules with one another.

In such chucking systems, which are also known as junction points or disconnection points, the purpose is to clamp the parts to be connected reliably and firmly to one another, exact positional fixation relative to one another of the parts to be connected being ensured by close-fitting surface engagement between a hollow shank of the one part and a receiving portion of the other part. The two parts to be connected are chucked or clamped against one another by the fact that the hollow shank is pulled into the receiving portion against an undercut chucking shoulder by application of chucking members of a chucking means. In the process, a contact pressure is produced between plane faces of the parts to be connected, and so the two parts clamped against one another become fixed in exact axial as well as radial position by the firm connection between the close-fitting faces.

More recently, the hollow-shank chucking system, in which the hollow shank has either cylindrical or conical structure, has become increasingly widely used. When the two parts to be connected are in joined-together condition, the chucking members used to clamp the parts against one another ensure not only that sufficient axial contact pressure is produced, but also that the hollow shank undergoes a certain degree of radial expansion, whereby the accuracy of fit between hollow shank and receiving portion is additionally improved.

As an example, there is proposed in German Patent Application No. 19753663.8 a chucking system for two parts to be connected, such as a tool-system module and a machine-tool spindle, wherein one part has a preferably cylindrical or conical hollow shank and the other part has a corresponding receiving portion for receiving the hollow shank in a precisely fitting relationship. The chucking system comprises a chucking means, disposed concentrically in the receiving portion of the other part, which chucking means extends into the hollow shank of the one part when the two parts are in abutting condition, and is provided with at least two chucking members that can move in opposite directions as well as an actuating means that drives the chucking members, by which actuating means the chucking members can be moved synchronously into and out of engagement with an undercut chucking shoulder of the hollow shank, whereby a contact pressure is produced between plane faces of the two parts to be connected. The chucking members are designed as head portions of elongated chucking elements, which are disposed substantially parallel to the longitudinal axis or axis of rotation of the receiving portion and which are braced axially via retaining portions against an undercut recess of the receiving portion. The chucking elements are connected to one another at their foot portions, this connection being achieved in the preferred embodiment by the fact that the chucking elements are formed by the branches of a U-shaped chucking fork of one-piece structure.

This conventional chucking system is characterized on the one hand by the fact that it works with a minimum of components and on the other hand by the fact that it permits simple, reliable and dimensionally stable coupling of the two parts to be connected without necessitating additional assembly or fastening fixtures.

On the one hand, however, because of the fact that the chucking elements must have a certain degree of elasticity, the design of this chucking system needs a somewhat greater overall axial length of the chucking elements and thus of the chucking means as a whole. On the other hand, since this chucking system can at best be held in the receiving portion via a loose fit with narrow clearance, it is difficult to satisfy the stringent requirements in terms of quality of balance of the overall system comprising machine-tool spindle, chucking means and tool mount with tool, especially at high speeds.

French Patent Application 2754201 A1 discloses a chucking system which is based on the principle of clamping two parts to be connected against one another by a chuck with chucking members. In this chucking system, the chucking members are guided to move slidingly in a radial direction in a carrier member anchored in the receiving portion of the one part and are moved in opposite directions synchronously into or out of engagement with an undercut chucking shoulder in the hollow shank of the other part by an actuator that is also received in the carrier member.

A chucking system is also known from U.S. Pat. No. 5466102. In this chucking system, two loosely disposed or at least not unequivocally fixed clamp-like chucking elements are brought interlockingly into or out of engagement with undercut chucking shoulders in the receiving portion of the one part and in the hollow shank of the other part by an actuator which drives the chucking elements.

The object of the present invention is to provide a chucking system that is optimized in terms of quality of balance of the overall system at high speeds, which system permits, with a minimum of moving parts, simple, reliable and dimensionally stable coupling of the two parts to be connected.

This object is achieved by the chucking system having the features of claim 1.

According to the invention, the chucking system has a carrier member which can be firmly anchored both radially and axially in the receiving portion of a machine-tool spindle, for example, by interference fit, for example, and on which the chucking elements are guided to move slidingly in radial direction. This structural solution has numerous advantages compared with the conventional chucking system. Because the carrier member is firmly anchored in the receiving portion, the number of parts which are movable on the two chucking elements during rotary operation is reduced. Since the chucking elements do not have to be elastically deformable in the manner which was necessary in the conventional chucking system and which was achieved by a relatively large axial length of the chucking elements, the overall axial length of the chucking elements in the inventive chucking system can be much shorter, in turn permitting lighter weight of the chucking elements as well as total weight of the chucking system. The fact that the chucking elements are disposed to move slidingly in radial direction on the carrier member also permits a rotationally symmetric configuration of the chucking elements, which during rotary operation represent the movable parts. These features contribute to a substantial improvement, compared with the conventional chucking system, in terms of positioning reproducibility in chucking and loosening the chucking means of the chucking elements, whereby the scatter of unbalance due to tolerance-related positional scatter of moving parts at high speeds is greatly reduced. Since the reproducibility of the balance condition of the overall system depends substantially on the positional reproducibility of the movable parts of the chucking system as well as the mass and rotational symmetry thereof, the inventive chucking system will satisfy the stringent requirements imposed at high speeds on quality of balance of the overall system, which comprises the two parts to be connected, such as machine-tool spindle and tool mount with tool, as well as the chucking system.

According to the invention, the chucking elements functioning to hold the parts to be connected against one another are designed as relatively robust clamps, which directly span the joint between the parts to be coupled, thus concentrating the flow of force on the smallest space. The efficiency of the chucking means thereby becomes very large, since the chucking means is particularly dimensionally stable by virtue of its geometry, which is preferably barrel-shaped or shell-shaped. In addition, reinforcement of the chucking force of the symmetric chucking elements is achieved as a result of centrifugal force during rotary operation of the chucking system. A further benefit can be seen in a possible increase of surface hardness and thus wear resistance of the chucking elements compared with the limited surface hardness of the chucking elements, which are subjected to bending load, of the conventional chucking system described hereinabove.

The inventive chucking system is further characterized by simple and compact construction, which makes it possible to clamp the parts to be connected against one another in reliable and dimensionally stable manner with a minimum of movable components. Furthermore, since a minimum of moving parts is present in the inventive chucking system, only little friction is produced during movement thereof. In this way an even greater chucking force between the two parts to be connected is achieved.

Further advantageous features of the present invention are subject matter of the dependent claims and/or will become clear from the description hereinafter, in which the inventive chucking system is explained in more detail by means of preferred practical examples.

Figure 1:
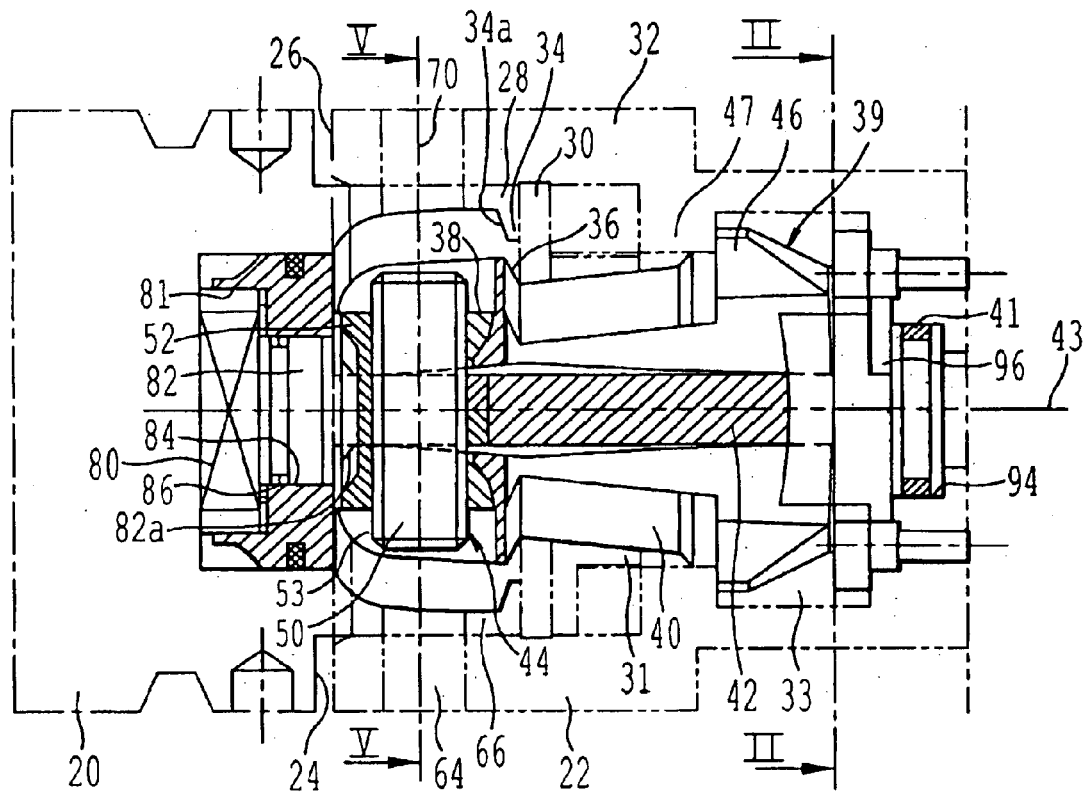
FIG. 1 shows a longitudinal section through the inventive chucking system according to a first practical example in loosened position.

In FIG. 1, reference symbol 20 denotes a part referred to hereinafter as the tool, for example a tool system module in the form of a basic tool mount, and reference symbol 22 denotes a part referred to hereinafter as the tool mount, such as a spindle of a machine tool. It must be stressed at this early point that the chucking system to be described in more detail hereinafter relates to the junction point between two parts to be connected, and that it is therefore usable for all areas of application in which two parts are to be connected to one another in centered and detachable relationship.

Figure 6:
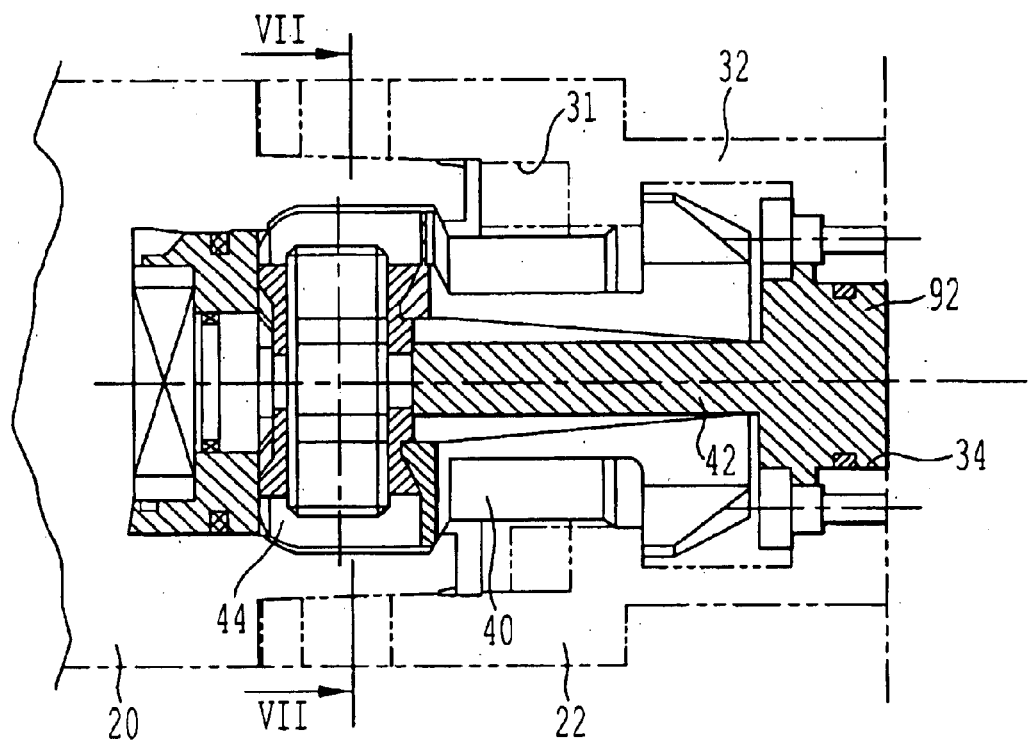
FIG. 6 shows a longitudinal section through the inventive chucking system according to the first practical example in chucked position.

In FIG. 1, tool 20 and tool mount 22 are shown in loosened condition, in which a radial annular face 24 of tool 20 is disposed at a distance from a radial annular face 26 of tool mount 22, although a hollow shank of tool 20 denoted by 28 is introduced in centered relationship in a corresponding recess 30 of a receiving portion 32 of tool mount 22. A plane gap is formed between the two radial annular faces 24, 26. FIG. 6 shows tool 20 and tool mount 22 in the condition in which they are clamped against one another. In this condition, hollow shank 28 of tool 20 is seated firmly in recess 30 of tool mount 22.

In the practical example shown in FIG. 1 and FIG. 6, the close-fitting faces between hollow shank 28 and recess 30 are formed by conical faces. It is equally possible, however, to achieve centering of hollow shank 28 in recess 30 via cylindrical faces.

Although the intimate connection between the conical close-fitting faces already acts as an anti-twisting safeguard for tool 20 and tool mount 22 when tool 20 and tool mount 22 are in the condition of being clamped against one another, additional protection against twisting between tool 20 and tool mount 22 can also be achieved by, for example, at least one driving block, which engages in a corresponding end recess of either the hollow shank or of the receiving portion.

In the first practical example shown in FIG. 1 and FIG. 6, parts 20, 22 to be connected as well as hollow shank 28 and the recesses formed in these parts, such as recess 30, have rotationally symmetric geometry. It must be emphasized, however, that the invention is not limited merely to such a geometry.

The inventive chucking system must be capable of clamping parts 20, 22 to be connected firmly against one another in predesignated radial and axial positions. As a further feature essential to the invention, besides a minimum number of movable components and simplicity of assembly, it must be possible to loosen the connected parts easily by imposing small travel distances. For this purpose, the inventive chucking system has the following construction:

Hollow shank 28 is provided in the radially inside region with an undercut chucking shoulder 34. Chucking shoulder 34 is formed by a wedge face, turned toward tool mount 22, of an annular recess of hollow shank 28. Wedge faces 36 of two chucking members 38 can be applied against chucking shoulder 34 by actuating the chucking system, in order to clamp tool 20 firmly against tool mount 22, preferably by a force-transmitting means.

The inventive chucking system is provided with a chucking means 39, which in turn comprises two chucking elements 40 disposed symmetrically relative to axis 43 of rotation, one carrier member 42 disposed between the two chucking elements 40 and one actuating means 44 for driving chucking elements 40, as well as an ejector member 80.

Figure 3:
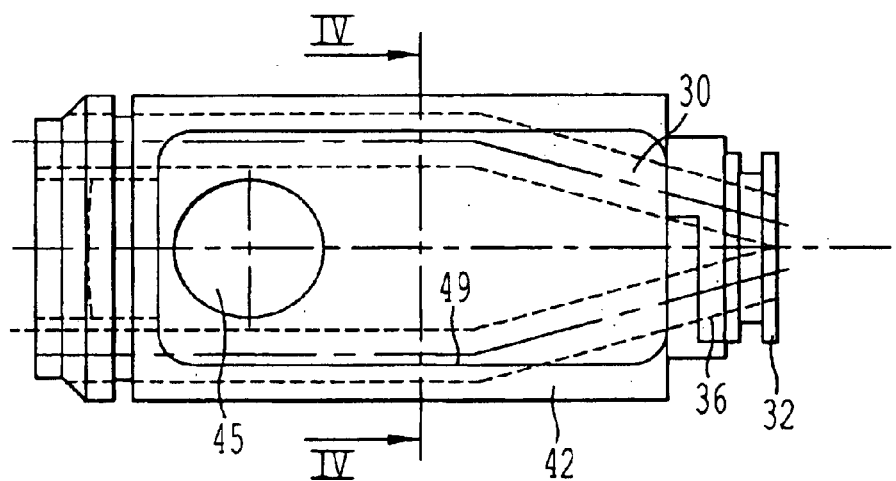
FIG. 3 shows a top view of a carrier member of the chucking system of FIG. 1.

Carrier member 42 is disposed in an axial recess 31 of receiving portion 32 of tool mount 22. Carrier member 42 is provided at its right side in FIG. 1 with a stub 92 of massive construction which, via a loose fit with narrow clearance, is received in an axial recess 94 as an extension of recess 31, sealing between these two parts being achieved by means of an O-ring 41. Carrier member 42 has the geometry illustrated in particular by FIGS. 2 to 6, and is firmly anchored both axially and radially in tool mount 22 in the manner of a quarter-turn fastener, as is evident from FIGS. 2 and 6. At its end turned toward tool 20, carrier member 42 has a radial opening 45, in which actuating means 44 for driving chucking members 38 is received, as is evident in particular from FIGS. 3 and 5.

Chucking elements 40 are each guided to move slidingly in radial direction on different sides of carrier member 42 in a slot 49 provided for this purpose. They have in particular an elongated, clamp-like geometry, and in the chucked position shown in FIG. 6 extend substantially parallel to axis 43 of rotation of tool mount 22. The head portions of chucking elements 40 form chucking members 38, each provided at the end of chucking elements 40 turned toward tool 20. Chucking elements 40 are each braced at their end turned toward tool mount 22 against carrier member 42, and in addition are in articulated engagement, via a retaining portion 46, with a fixation shoulder 47 of an undercut recess 33 adjoining axial recess 31 of receiving portion 32. Chucking elements 40 therefore have the function of a clamp, which in the chucked position of the chucking system shown in FIGS. 6 and 7 clamps tool 20 against tool mount 22.

Figure 5:
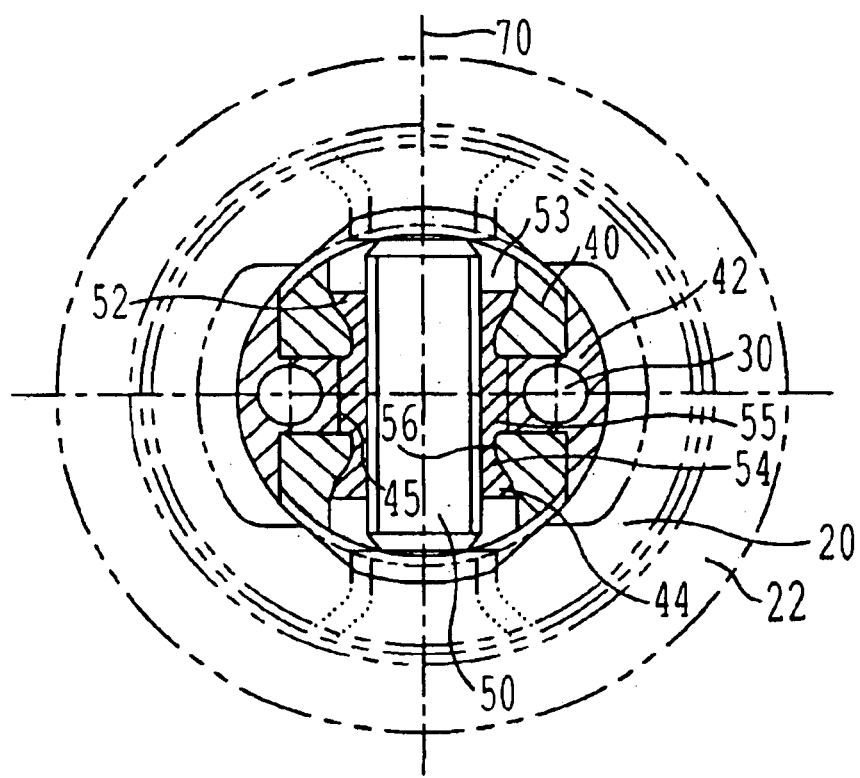
FIG. 5 shows a cross section through the chucking system of FIG. 1 along line V—V.

In the diagrams of FIGS. 1 and 5, actuating means 44 is provided with a threaded spindle 50 as well as two symmetric chucking nuts 52. Threaded spindle 50 is subdivided into two oppositely threaded regions, on each of which one of the chucking nuts 52 is seated. Chucking members 38 are each provided on the end turned toward tool 22 with a cup-shaped concave hollow 53, which opens in the manner of a fork toward tool 20. Chucking nuts 52 are matched to cavities 53 in that each is provided with a cup-shaped convex portion 54, which is disposed radially outside relative to axis 43 of rotation and, as is evident from FIGS. 1 and 5, is received interlockingly in the corresponding cavity 51, as well as with a portion 55 which adjoins portion 54 and is disposed radially inside relative to axis 43 of rotation. As is evident from FIGS. 1 and 5, portions 54 and 55 define a constriction 56, via which the respective chucking nut 52 is retained interlockingly with the respective chucking member 38 such that the slight movement of chucking nuts 52 relative to chucking members 38 necessary for a swiveling movement of chucking elements 40 is indeed possible, while chucking nuts 52 are nevertheless disposed such that substantially they rotate with axis 70 of rotation of threaded spindle 50. Since both chucking nuts 52 are therefore pivotally mounted relative to chucking members 38 as a ball-and-socket bearing or a ball joint, this embodiment of actuating means 44 offers the advantage that the axis of rotation of threaded spindle 50 is substantially always oriented radially relative to axis 43 of rotation.

Figure 7:
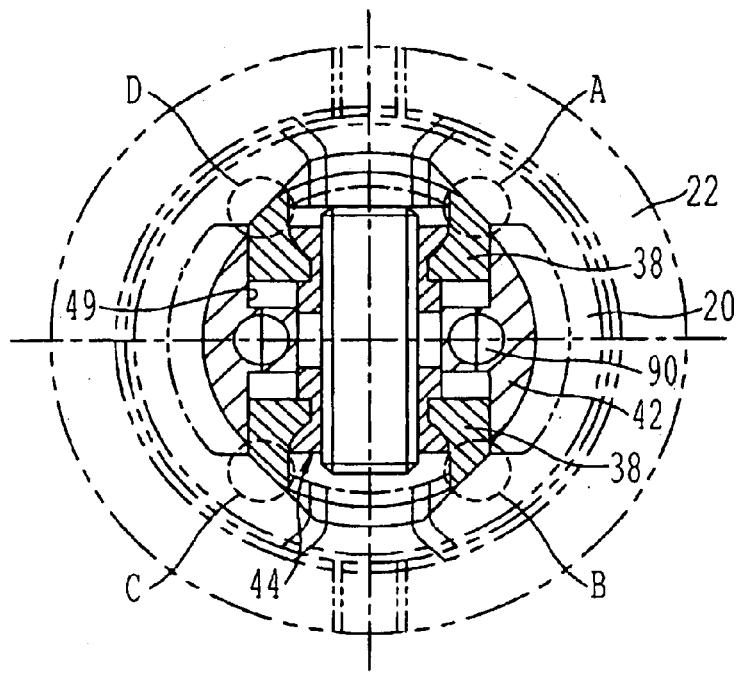
FIG. 7 shows a cross section through the chucking system of FIG. 6 along line VII—VII.

By virtue of the interlocking connection between chucking nuts 52 with the respective chucking member 38, rotary actuation of threaded spindle 50 brings about a swiveling movement of chucking elements 40 around an axis of rotation that is not illustrated but is oriented perpendicular to axis 43 of tool mount 22, whereupon chucking elements 40 execute a swiveling movement around fixation shoulder 47 of undercut recess 33, while at the same time they are braced against carrier member 42 at their end turned toward tool mount 22. Rotary actuation of threaded spindle 50 is brought about, for example, by a tool introduced radially from outside in a direction substantially perpendicular to the longitudinal axis or axis 43 of rotation of tool mount 22, through a radial opening 64 in receiving portion 32 of tool mount 22 on the one hand and through a radial opening 66 in hollow shank 28 of tool 20. As is evident in FIGS. 1 and 5, axis 70 of rotation of threaded spindle 50 is substantially aligned with the axes of radial openings 64, 66, which preferably are made as bores. Clockwise actuation of chucking screw 42 generally causes chucking members 38 to move apart synchronously, thus clamping tool 20 against tool mount 22. In the process, starting from the loosened position illustrated in FIGS. 1 and 5, chucking members 38 and thus chucking elements 40 gradually occupy the chucked position illustrated in FIGS. 6 and 7. In FIG. 7, the four chucking points A, B, C, D in the chucked position of the inventive chucking system are indicated by means of dashed circles. By analogy, counterclockwise actuation of chucking screw 42 causes chucking members 38 to move synchronously toward one another, thus loosening the wedge-face connection between wedge faces 34, 36 and thus the connection of tool 20 and tool mount 22. The diagram in FIG. 5 reveals that chucking members 38 can be brought together by the counterclockwise actuation of chucking screw 42 at most until the two chucking nuts 52 abut against one another.

In the chucked position shown in FIG. 6, chucking members 38 are braced via wedge faces 36 against the wedge face of chucking shoulder 34. Wedge-face contact 34, 36 then ensures that hollow shank 28 of tool 20 tends to become expanded, whereby the close-fitting contact between hollow shank 28 and recess 31 becomes even more intimate. In this chucked condition, the connection between the close-fitting faces of hollow shank 28 and recess 30 is ensured by friction and force.

As is evident in FIG. 1, carrier member 42 is further provided on its end turned toward tool 20 with an axial receiving recess 81 to receive ejector member 80. Ejector member 80 is provided in its axial extension with a plunger 82 which, as is evident in FIG. 1, extends up to chucking members 38 in an axial recess 84 adjoining receiving recess 81 and is received sealingly in this recess 84 by means of an O-ring 86. Ejector plunger 82 is provided with a central projection having a conical face 82a on the end turned toward chucking members 38. When the engagement of wedge faces 36 of chucking members 38 with the wedge face provided on undercut chucking shoulder 34 is loosened as a result of corresponding rotary actuation of threaded spindle 50, chucking members 38 move radially inward toward one another, whereupon the functional contact between wedge faces 36 and chucking shoulder 34 is gradually relaxed. At the same time, chucking members 38 travel synchronously over the conical face of ejector plunger 82. By further rotation of threaded spindle 50, the radially acting force applied by threaded spindle 50 to chucking members 38 is transformed to an axially directed force acting on ejector plunger 82, whereby ejector member 80 is pressed with increasing force against a corresponding bracing face of tool 22, so that a centrally acting, positive force is exerted on tool 22. In this way chucking members 38 synchronously become part of a wedge mechanism, with which hollow shank 28 can be forced out of receiving portion 32. This leads to separation of the connection created between tool and tool mount by the engagement of wedge faces 36 of chucking members 38 with undercut chucking shoulder 34. Since the ejector plunger is centrally disposed, symmetric force relationships for the ejection process can be achieved very simply, and so reliable separation of the two parts 20, 22 can be achieved even in the case of the most intimate adhesion between conically shaped centering faces on the outer face of the hollow shank on the one hand and on the sides of recess 30 of receiving portion 32 on the other hand.

Figure 2:
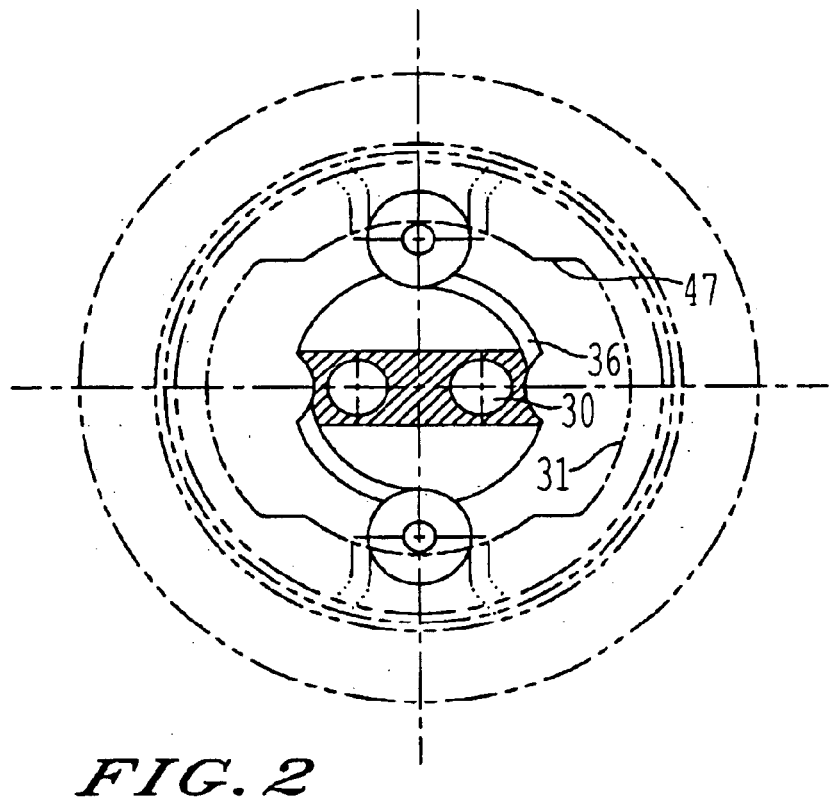
FIG. 2 shows a cross section through the chucking system of FIG. 1 along line II—II.
Figure 4:
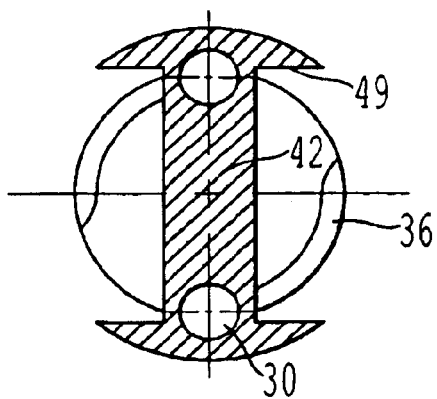
FIG. 4 shows a cross section through the carrier member of FIG. 3 along line IV—IV.

As shown in FIG. 2, a coolant and lubricant supply system 90, via which coolant and/or lubricant can be supplied to tool 20 assembled on tool mount 22, is also integrated into carrier member 42.

Figure 8:
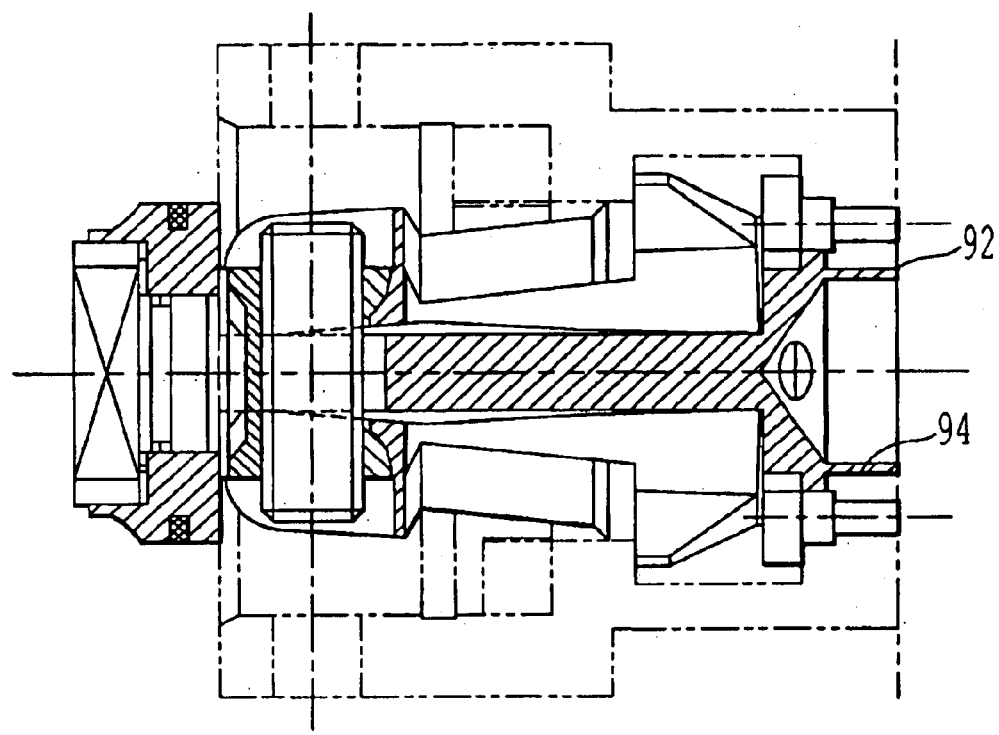
FIG. 8 shows a longitudinal section through the inventive chucking system according to a second practical example in loosened position.
Figure 9:
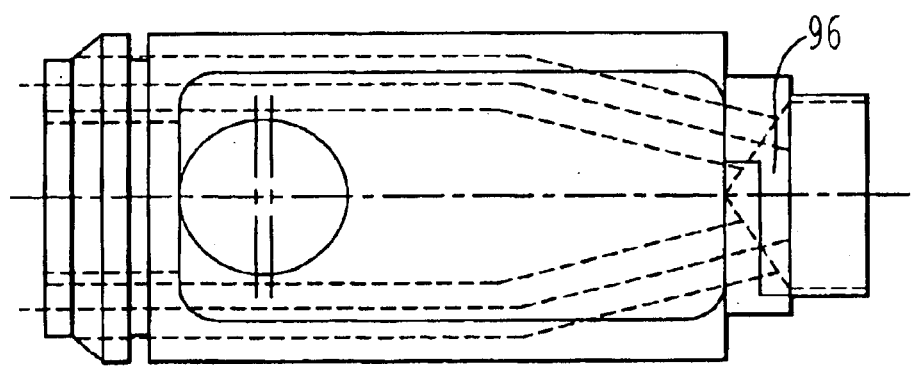
FIG. 9 shows a top view of a carrier member of the chucking system of FIG. 8.

In FIGS. 8 and 9, the inventive chucking system is illustrated by a second practical example. This second practical example differs from the first practical example only in the structural geometry of axial stub 192 provided on carrier member 42, which stub, as illustrated in FIGS. 8 and 9, is designed as a thin-walled member received via a loose fit with narrow clearance and thus with slight elastic deformation in axial recess 194 of receiving portion 32. Compared with a massive construction of the stub, this embodiment creates the advantage of more accurate positioning of carrier member 42 in receiving portion 32.

What is claimed is:

1. A chucking system for detachable connection of first and second parts, of which the first part has a hollow shank and the second part has a corresponding receiving portion for receiving the hollow shank in a precisely fitting relationship, with a chucking means, disposed concentrically in the receiving portion, which extends into the hollow shank of the first part when the first and second parts are in abutting condition, and is provided with at least two chucking members that can move in opposite directions as well as an actuating means that drives the chucking members, by which actuating means the chucking members can be moved synchronously into and out of engagement with an undercut chucking shoulder of the hollow shank, whereby a contact pressure is produced between plane faces of the first and second parts to be connected, the chucking members being designed as head portions of elongated chucking elements, which are disposed substantially parallel to an axis of rotation of the receiving portion and which are braced in articulated relationship by retaining portions against an undercut recess of the receiving portion, wherein the chucking elements are guided to move slidingly in a radial direction in guide slots on a carrier member, which can be anchored axially and radially therein on a first end turned toward the receiving portion and which is provided at a second end turned toward the hollow shank with a radial opening for receiving the actuating means for driving the chucking members.

2. A chucking system according to claim 1, wherein the chucking elements are braced at foot portions against the carrier member.

3. A chucking system according to claim 1, wherein the carrier member is provided on its second end facing the hollow shank with a receiving recess for receiving an ejector member, which can be moved axially by the chucking members during loosening of engagement with the undercut chucking shoulder.

4. A chucking system according to claim 3, wherein the receiving recess is formed centrally in the carrier member.

5. A chucking system according to claim 4, wherein the ejector member is provided with an axial extension which is guided to move slidingly in the receiving recess and which has a face arrangement inclined relative to the axis of movement or a conical face, on which the chucking members can travel, during loosening of the engagement with the undercut chucking shoulder of the hollow shank.

6. A chucking system according to claim 3, wherein the axial extension of the ejector member is received sealingly in the receiving recess of the carrier member.

7. A chucking system according to claim 1, further comprising a coolant and lubricant supply system formed in the carrier member for transport of at least one of a coolant and a lubricant from the part carrying the receiving portion to the part carrying the hollow shank.

8. A chucking system according to claim 1, wherein the carrier member is provided on its first end turned toward the receiving portion with an axially extending stub, which is received sealingly in a corresponding axial stub recess in the part carrying the receiving portion.

9. A chucking system according to claim 8, wherein the stub is of massive construction and is received by a loose fit with narrow clearance in the axial stub recess.

10. A chucking system according to claim 8, wherein the stub is of thin-walled construction and is received by an interference fit in the axial stub recess.

11. A chucking system according to claim 1, wherein the carrier member is anchored by a quarter-turn fastener in the receiving portion.

12. A chucking system according to claim 1, wherein the clamping members are each provided with a wedge-face arrangement, which cooperates with a mating face provided on the undercut chucking shoulder of the hollow shank.

13. A chucking system according to claim 12, wherein the undercut chucking shoulder is part of a recess with a closed annular cross-section formed in the hollow shank.

14. A chucking system according to claim 1, wherein the first and second parts to be connected are constructed as rotationally symmetric parts and pressure-bearing faces of the first and second parts to be connected are constructed as radial annular faces.

15. A chucking system according to claim 1, wherein the close-fitting faces between the hollow shank and the receiving portion are formed by conical faces.

16. A chucking system according to claim 1, wherein the receiving portion and the hollow shank each have a radial opening, which is aligned with the radial opening in the carrier body and by which a tool for driving the actuating means can be introduced from outside.

17. A chucking system according to claim 16, wherein the actuating means is provided with a threaded spindle that can be actuated by the tool and that has two oppositely threaded portions as well as two corresponding, symmetric chucking nuts, which are seated respectively on one of the threaded portions.

18. A chucking system according to claim 17, wherein the chucking nuts are each cup-shaped and are supported in a corresponding cup-shaped cavity in the respective chucking member.

\* \* \* \* \*